United States Patent
Wooldridge et al.

(10) Patent No.: US 10,991,037 B1
(45) Date of Patent: Apr. 27, 2021

(54) ANALYZING TRACKING REQUESTS GENERATED BY CLIENT DEVICES BASED ON METADATA DESCRIBING WEB PAGE OF A THIRD PARTY WEBSITE

(71) Applicant: Facebook, Inc., Menlo Park, CA (US)

(72) Inventors: Tobias Henry Wooldridge, Seattle, WA (US); Aleksey Sergeyevich Fadeev, Seattle, WA (US); Christine Jinha Hwang, La Crescenta, CA (US); Luxi Guo, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 365 days.

(21) Appl. No.: 15/895,749

(22) Filed: Feb. 13, 2018

(51) Int. Cl.
*G06Q 30/00* (2012.01)
*G06Q 30/06* (2012.01)
*G06F 16/907* (2019.01)
*G06F 16/951* (2019.01)

(52) U.S. Cl.
CPC ....... *G06Q 30/0643* (2013.01); *G06F 16/907* (2019.01); *G06F 16/951* (2019.01); *G06Q 30/0603* (2013.01); *G06Q 30/0613* (2013.01)

(58) Field of Classification Search
None
See application file for complete search history.

(56) References Cited

U.S. PATENT DOCUMENTS

| | | | | |
|---|---|---|---|---|
| 9,152,990 B1 * | 10/2015 | Kanter | ............... | G06Q 30/0609 |
| 9,721,291 B1 * | 8/2017 | Kennis | ............... | G06Q 30/0643 |
| 10,169,810 B2 * | 1/2019 | Konigsberg | .......... | G06F 40/289 |
| 10,713,328 B2 * | 7/2020 | Williams | ............... | G06F 16/958 |
| 2005/0149396 A1 * | 7/2005 | Horowitz | ............... | G06Q 30/02 705/14.41 |
| 2011/0078487 A1 * | 3/2011 | Nielsen | ................... | G06Q 30/02 714/2 |
| 2011/0125593 A1 * | 5/2011 | Wright | ................... | G06Q 30/02 705/14.73 |
| 2014/0279233 A1 * | 9/2014 | Lau | ..................... | G06Q 30/0207 705/26.41 |
| 2015/0066893 A1 * | 3/2015 | Sanders | ............. | G06Q 30/0278 707/709 |

(Continued)

OTHER PUBLICATIONS

Zheng Qin, "Introduction to E-commerce", 2009, Springer, springer.com (Year: 2009).*

(Continued)

*Primary Examiner* — Jason B Dunham
*Assistant Examiner* — Norman Donald Sutch, Jr.
(74) *Attorney, Agent, or Firm* — Fenwick & West LLP (57) ABSTRACT

An online system receives tracking requests from client devices interacting with a website. The online system analyzes user interactions with websites using the tracking requests. The online system identifies missing parameters in the tracking requests and predicts values of the missing parameters. The online system may also identify parameters that are populated incorrectly and predicts their correct values. The online system uses the predicted parameter values for generating reports describing user interactions with the website. The online system predicts the values of the missing parameters based on metadata extracted from previous tracking requests received from client devices and also via web crawling of websites. The online system generates accurate reports based on the predicted parameters values.

19 Claims, 5 Drawing Sheets

(56) References Cited

U.S. PATENT DOCUMENTS

2016/0283481 A1* 9/2016 Morley .............. G06F 16/9535
2017/0236167 A1* 8/2017 Bindra .............. G06Q 30/0277
　　　　　　　　　　　　　　　　　　　　　　　705/14.73
2017/0243243 A1* 8/2017 Kosai ................... G06Q 10/067

OTHER PUBLICATIONS

Wireless News; "Logentries Rolls Out Pixel Tracking"; Mar. 25, 2014; M2 Communications, Ltd. (Year: 2014).*

* cited by examiner

ANALYZING TRACKING REQUESTS GENERATED BY CLIENT DEVICES BASED ON METADATA DESCRIBING WEB PAGE OF A THIRD PARTY WEBSITE

BACKGROUND

This disclosure relates generally to analyzing tracking requests received by an online system from client devices rendering web pages received from a website, and in particular to determining missing information in tracking requests received by the online system from client devices.

Online systems such as social networking systems track user interactions with the online system so that they can provide features and content that is relevant to each user. The online system logs user interactions with the online system for analysis. However, online systems also prefer to monitor user interactions with external systems such as third party websites. An online system may not have direct access to logs of the external website. However, a client device can send a tracking request to the online system describing user interactions between the client device and the external website.

An external website provides instructions with the web page that are executed by the client device when the client device renders the web page. These instructions cause the tracking request to be generated for sending information to the online system. However, sometimes tracking requests received from client devices have missing or incorrect parameter values. This may happen due to defects in the instructions provided by a web page to the client device for generating the tracking requests. For example, the instructions processed by the client devices may fail to populate certain parameter values or may populate parameter values incorrectly. Any analysis performed by the online system based on such missing information received from client devices is incomplete and results in the online system making incorrect inferences and taking wrong actions based on the inferences, for example, sending irrelevant content to a user.

SUMMARY

An online system receives tracking requests from client devices interacting with a website to analyze user interactions with the website. The website provides instructions with web pages sent to a client device that cause the client device to send tracking instructions to the online system. A tracking request includes various parameters, for example, parameters representing attributes of items described in webpages provided to client devices by websites. A tracking request may be missing values of certain parameters, for example, due to errors in the instructions that populate the parameters. The online system predicts values of the missing parameters.

The online system stores data describing various items in a metadata store. The data stored in the metadata store may be obtained from tracking requests obtained from various client devices. The online system may also obtain metadata by crawling websites and store the data in the metadata store. The online system determines values of missing parameters in tracking requests based on the data describing various items stored in the metadata store. In an embodiment, the online system ranks items obtained from the metadata store based on various factors to a matching item for a current tracking requests. For example, items that were identified in tracking requests of a current session are weighted higher than items identified in previous tracking requests associated with the current user, which in turn is weighted higher than items identified in tracking requests from other users, for example, users matching the user profile of the current user. The online system uses the predicted labels to generate accurate reports describing user interactions with the third party website.

BRIEF DESCRIPTION OF THE DRAWINGS

The teachings of the embodiments can be readily understood by considering the following detailed description in conjunction with the accompanying drawings.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Environment

Figure 1:
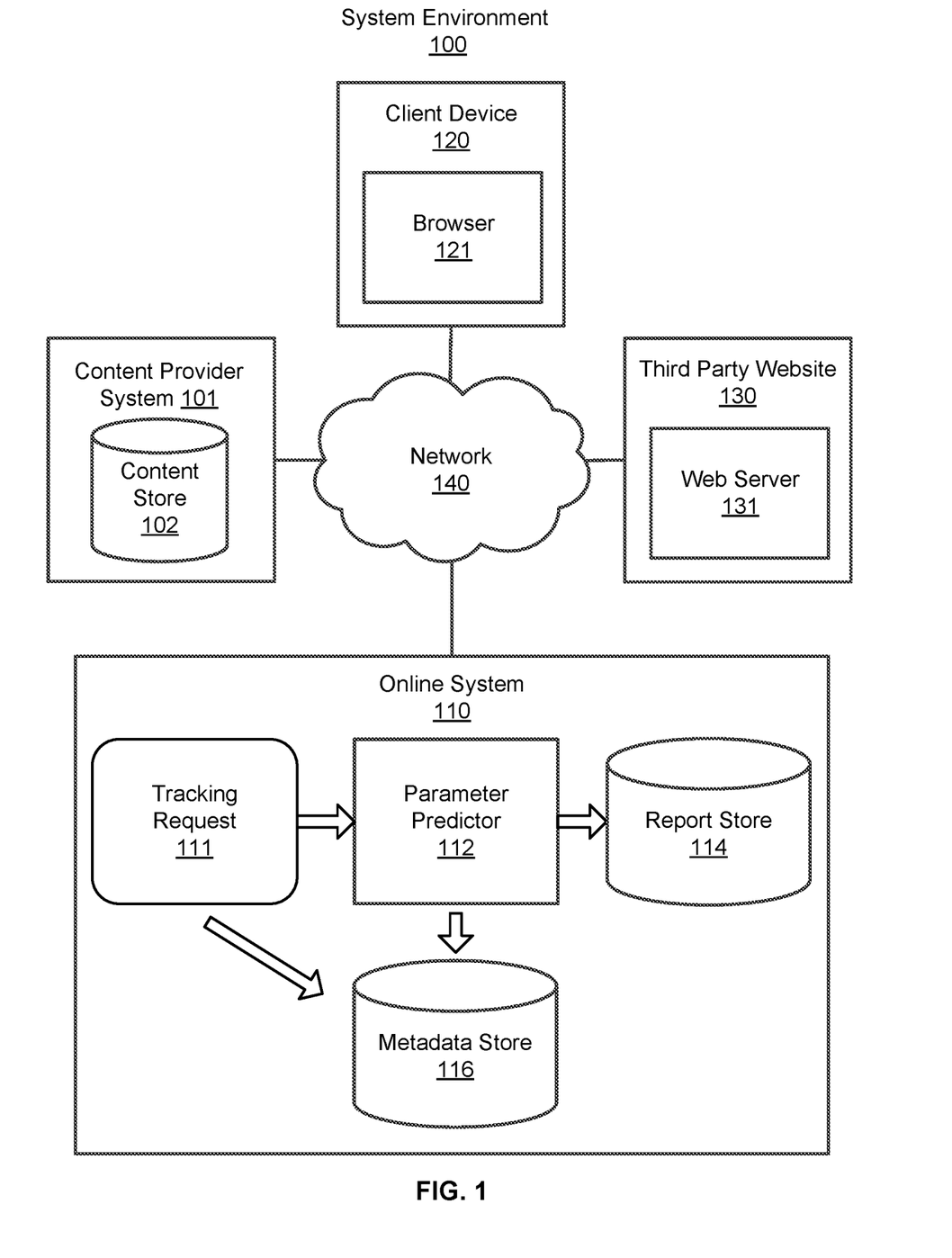
FIG. 1 is a block diagram of a system environment in which the online system operates, in accordance with an embodiment.

FIG. 1 is a block diagram of a system environment 100 in which an online system 110 operates, in accordance with an embodiment. In the embodiment illustrated in FIG. 1, the system environment 100 includes a content provider system 101, an online system 110, client devices 120, a third party website 130, and a network 140. The content provider system 101 includes a content store 102 for storing content items. The third party website 130 includes a web server 131 for delivering content items to users via client devices 120. The client devices 120 include a browser 121 that provides an interface through which users can access a third party website 130. The online system 110 includes, in part, a tracking request 111 signal, a parameter predictor 112, a report store 114, and a metadata store 116.

The content provider system 101 shown in FIG. 1 provides electronic media content items to the online system 110 for delivering to the client devices 120. Alternatively, the content provider system 101 may provide the content to a third party website 130 for providing to users of the third party website 130. The content provider system 101 may be associated with a user, an enterprise, an organization, or a group, for example, a political campaign, a university, a corporation, the government, etc. In an embodiment, a content item is a sponsored content item for which a content provider associated with the content provider system 101 provides remuneration to the online system (or a content publisher) for delivery of the content items to an online audience via the client devices 120. The term "content item" refers to "electronic media content item" wherever it appears herein. Content items may be images, text paragraphs, video clips, audio clips, hyperlinks, online forms, etc. Examples of sponsored content items include online advertisements.

The content store 102 shown in FIG. 1 is used by the content provider system 101 for storing content items. The content store 102 may be organized as a database, table, file, etc., stored on one or more of removable or non-removable memory cards, tape cassettes, zip cassettes, and computer hard drives. The content store 102 may include multiple data fields, each describing one or more attributes of the content items. The content store 102 may include, for a single content item—a content provider identifier (e.g., whether the content item is provided by the government), a list of policies and one or more weights regarding delivering of the content item to the client devices 120 and the third party website 130, one or more threshold rates of client interactions, a list of desired client interactions, such as clicking on a link in a content item, closing a content item using a close button on a browser of a client device, sharing a content item from a first client device to a second client device, performing a transaction associated with a content item, and so on. The content store 102 may also store for all content items—the number of content items to be delivered in a given time interval, a length of a time interval during which the content items are expected to be delivered, an estimate of a total number of deliveries of content items during the time interval, and so on. A delivery of a content item refers to an instance of a particular content item being delivered to a user. For example, if the same content item is delivered to multiple users or multiple times to the same user, each instance is referred to as a delivery.

The third party website 130 can be any website that provides content to users. For example, the third party website 130 may be a digital publisher of newspapers, e-books, digital magazines, digital libraries, digital catalogues, etc. The third party website 130 may distribute content including web pages, videos, and text, for example, books, magazines, and newspapers to users through tablet reading devices, distribution via the Internet (in the form of the browser 121 accessible by the client devices 120), other interactive media, etc. The third party website 130 is a collection of web pages, including multimedia content, typically identified with a common domain name, and published on at least one web server 131. The third party website 130 may be accessible via a public Internet Protocol (IP) network, such as the Internet, or a private local area network (LAN), by referencing a uniform resource locator (URL) that identifies the site. The third party website 130 can have many functions and can be used in various fashions—a personal website, a commercial website for a company, a government website, a non-profit organization website, website for entertainment, social networking system, a website providing news or educational content, private website such as a company's website for its employees typically a part of an intranet, etc.

In one embodiment, the third party website 130 can embed tracking instructions for generating tracking requests within one or more web pages of the third party website 130 in order to track user interactions. In an embodiment, the tracking instructions are associated with one or more tracking pixels. A tracking pixel is a portion of a web page, for example, a segment of HTML code that produces a transparent 1×1 image, an iframe, or other suitable object that may be embedded in a web page sent to a client device by the third party website 130. A tracking pixel is activated, or triggered, when a web page is loaded (e.g., rendered) into a user's browser 121 on a client device 120 for viewing. When a tracking pixel is rendered, the HTML code of the tracking pixel sends a tracking request, to the online system 110. The tracking request may include information (e.g., parameters) describing an item, or items, displayed on the web page being rendered such as an item category, item price, and/or an item rating. For example, the third party website may provide products/services that a user can view and/or purchase via a client device and a tracking request may provide details of the product/service to the online system. These details may include an identifier for the product, a price of the product, attributes of the product such as color, size, and any other description of the product. In one embodiment, the tracking request may include information describing the web page being rendered, for example, a label describing the web page, metadata describing values, data, or widgets presented to the user by the web page, and so on. The tracking request may extract the metadata describing items from the markup language of the webpage. The online system 110 receives the tracking request. Tracking requests convey to the online system 110 information describing user interaction of a user with a third party website 130 or any third party website external to the online system. For example, a tracking pixel may trigger when the client device renders a web page of a shopping website as a user adds an item to a shopping cart. When the web page is rendered, the client device sends a tracking request to the online system 110 identifying the user, the item the user added to the shopping cart, and any metadata describing the item.

The client devices 120 shown in FIG. 1 can be used by online system 110 users for interacting with the online system 110 and the third party website 130. Each client device 120 is a computing device capable of receiving client input as well as transmitting and/or receiving data via the network 140. The client device 120 may be a conventional computer system, such as a desktop or laptop computer. Alternatively, the client device 120 may be a device having computer functionality, such as a personal digital assistant (PDA), a mobile telephone, a smartphone or another suitable device. The client device 120 may execute an application allowing a user of the online system 110 to interact with the online system 110 and/or the third party website 130. In one example, the client device 120 executes a browser application 121 to enable interaction between the client device 120 and the online system 110 via the network 140. In one example, the client device 120 interacts with the third party website 130 through an application programming interface (API) running on a native operating system of the client device 120, such as IOS® or ANDROID™. A user may download content items from the online system 110 to the client device 120 using the browser 121. In addition, a user may interact with the content items by clicking on a link in a content item, filling in client information into an online form, closing the content item using a "close window" button on the browser 121 or on the client device 120, etc.

The online system 110 receives tracking requests 111 from client devices 120, determines whether any parameters are missing in the tracking request and predicts the values of the missing parameters. For example, a client device may send a tracking request responsive to rendering a web page showing an item added to a shopping cart but fail to provide the price of the item in the tracking request. Accordingly, the online system predicts the price of the item to be able to generate accurate reports describing the user interactions with the third party website. In one embodiment, the online system 110 provides tracking pixel markup language code, for example, HTML code to third party websites 130 that are interested in providing information describing user interactions with the third party website 130 to the online system 110. The online system 110 may generate reports based on the parameters received with tracking requests and provide the generated reports to users, for example, administrators of the third party website 130. For example, if the online system 110 is a social networking system, the online system 110 may generate reports that combine demographic information of users that is stored in the social networking system with user interaction patterns of the third party website 130. This allows the third party website 130 to analyze how users having different demographics interact with the third party website 130.

In another embodiment, third party web sites 130 may generate their own tracking pixel HTML code and associated parameters and provide the online system 110 with tracking requests as the tracking pixel is rendered on client devices of users. In the embodiment illustrated in FIG. 1, the online system 110 comprises, in part, a tracking request 111, a parameter predictor 112, a metadata store 116, and a report store 114.

A tracking request 111 is sent to the online system 110 from a third party website 130 for each instance that a tracking pixel placed within a web page of a third party website 130 is rendered by the client device 120. Each tracking request 111 contains parameters describing an item, or items, displayed on the web page on which the tracking pixel is embedded. Upon receiving these parameters, the online system extracts metadata from the markup language document of the web page associated with each tracking request (e.g., item category, item price, item rating, item brand, etc.). The metadata extracted from the markup language document is also simply referred to herein as metadata. Because the parameters contained within each tracking request may be generated by a third party website 130, parameters may not accurately describe the item displayed on the web page from which the tracking request was sent. For example, a tracking pixel embedded within a web page displaying a pair of tennis shoes on a third party website 130 may incorrectly identify the tennis shoes as dress shoes. Accordingly, the tracking pixel of the web page may be triggered by a client device 120 which sends a tracking request 111 to the online system 110 identifying the tennis shoes as dress shoes, thereby providing an incorrect item category. In an embodiment, the online system 110 uses the parameters received in the tracking request to determine whether metadata describing an item is correct. Furthermore, if the online system 110 determines that the parameters are incorrect, the online system 110 generates correct parameters to describe the item. Alternatively, the tracking request may be missing certain values. In the above example, the tracking request may fail to provide the size of the shoes or the price of the shoes. The online system predicts the missing parameter values.

The parameter predictor 112 receives a tracking request 111 from a third party website 130 as input and predicts parameters describing an item displayed on a web page on which a tracking pixel is embedded. The online system 110 uses various tracking requests 111 to extract metadata describing items, such as an item category, an item price, an item rating, an item brand, and/or a demographic of users that are typically interested in an item, for example. The online system 110 stores the extracted metadata in the metadata store 116. In an embodiment, the metadata store 116 represents a product catalog that is built by the online system by processing data received from a large number of tracking requests over time. In addition, the online system 110 may invoke a website crawler that performs a web crawl in search of metadata describing the item, or items, directly from the third party website 130.

The parameter predictor 112 can use this metadata to predict parameters that describe the item. The parameter predictor 112 may also predict parameters based on previous actions of the user that sent the tracking request, such as previously adding an item to a cart, previously purchasing similar items, and/or previously browsing related items, for example. The parameter predictor 112 may also predict parameters based on previous actions of other users that that are similar to the current user associated with the current tracking request, for example, users with similar demographics. The online system can use these predicted parameters to, both, verify the validity of parameters received through tracking requests 111 and identify any parameters missing from tracking requests 111. The online system 110 may store parameters in the metadata store 116, where they can be used to verify existing metadata, or annotate an entry in the metadata store 116 with missing metadata. In an embodiment, if the online system 110 generates reports describing the item, the online system 110 may convert incorrect parameters to correct parameters to generate an accurate report. These reports are stored in the report store 114. The parameter predictor 112, the metadata store 116, and the report store 114 will be discussed further in the following section.

The content provider system 101, third party website 130, client devices 120, and the online system 110 are configured to communicate via the network 140 shown in FIG. 1, which may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

The online system 110 as disclosed provides benefits and advantages that include increased engagement of users with content items and accurate reporting of data describing user interactions with third party websites. Other advantages of the system include efficient delivery of content to users by eliminating delivery of content items in cases where users are unlikely to interact with the content items, faster processing of the online system since fewer content items are transmitted, less power consumption, lower latency in content transmission, less data transmitted over the network, etc.

System Architecture

Figure 2:
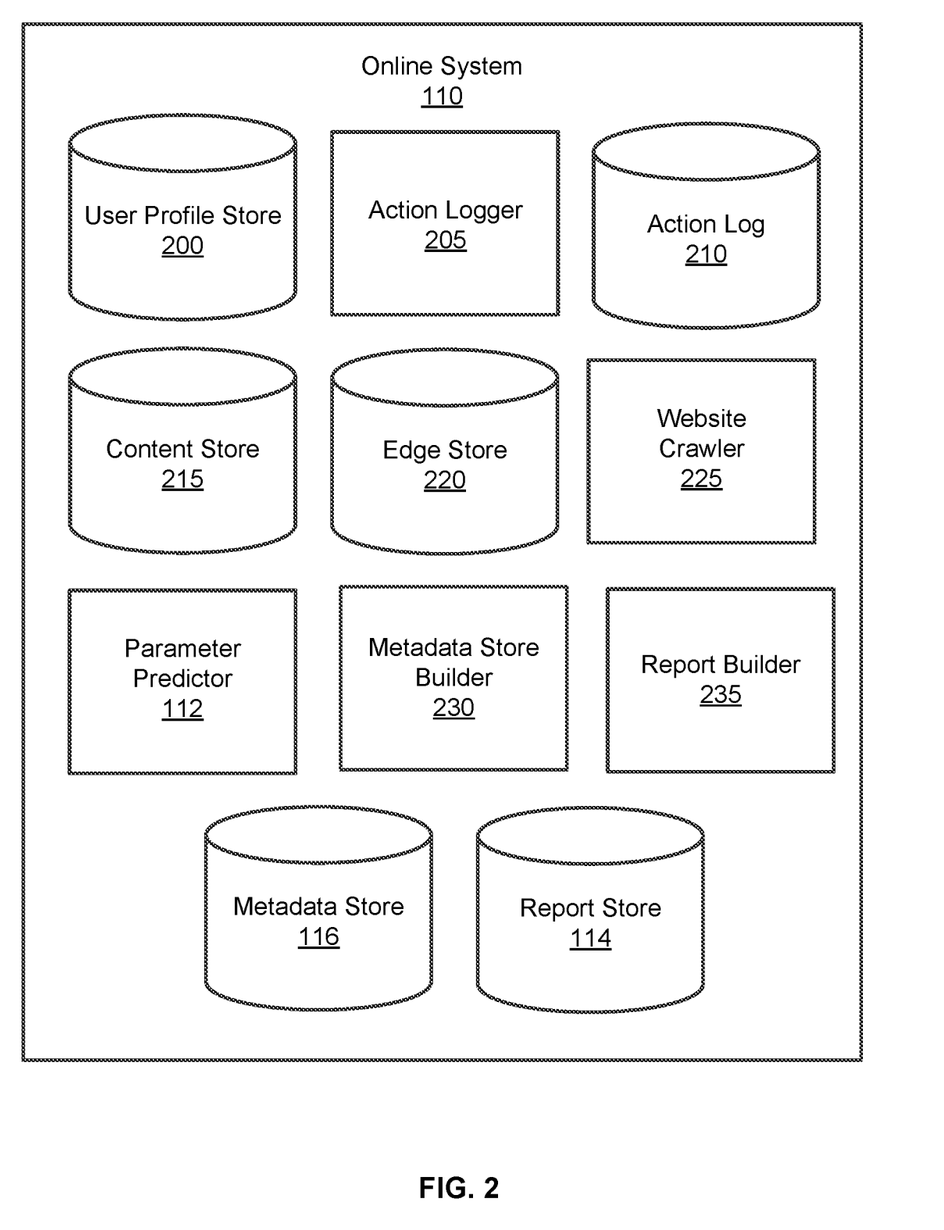
FIG. 2 is a block diagram of a system architecture of the online system, in accordance with an embodiment.

FIG. 2 is a block diagram of an online system 110 according to one embodiment. In the embodiment illustrated in FIG. 2, the online system 110 includes a user profile store 200, an action logger 205, an action log 210, a content store 215, an edge store 220, a website crawler 225, a parameter predictor 112, a metadata store builder 230, a report builder 235, a metadata store 116, and a report store 114. In other embodiments, the online system 110 may include additional, fewer, or different components for various applications.

Conventional components such as network interfaces, security functions, load balancers, failover servers, management and network operations consoles, and the like are not shown so as to not obscure the details of the system architecture.

Each user of the online system 110 is associated with a user profile, which is stored in the user profile store 200. A user profile includes declarative information about the user that was explicitly shared by the user and may also include profile information inferred by the online system 110. In one embodiment, a user profile store 200 of an online system user includes multiple data fields, each describing one or more attributes of the user. Examples of information stored in a user profile store 200 include biographic, demographic, and other types of descriptive information, such as work experience, educational history, gender, hobbies or preferences, location and the like. A user profile may also store other information provided by the user, for example, images or videos. In certain embodiments, an image of a user may be tagged with information identifying the online system 110 user displayed in an image. A user profile in the user profile store 200 may also maintain references to actions by the corresponding user performed on content items in the action log 210.

While user profiles in the user profile store 200 are frequently associated with individuals, allowing individuals to interact with each other via the online system 110, user profiles may also be stored for entities such as businesses or organizations. This allows an entity to establish a presence on the online system 110 for connecting and exchanging content with other online system 110 users. The entity may post information about itself, about its products or provide other information to users of the online system 110 using a brand page associated with the entity's user profile. Other users of the online system 110 may connect to the brand page to receive information posted to the brand page or to receive information from the brand page. A user profile associated with the brand page may include information about the entity itself, providing users with background or informational data about the entity.

The action logger 205 receives communications about user actions internal to and/or external to the online system 110, populating the action log 210 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 210.

The action log 210 may be used by the online system 110 to track user actions on the online system 110, as well as actions on third party websites 130 that communicate information to the online system 110. Users may interact with various objects on the online system 110, and information describing these interactions is stored in the action log 210. Examples of interactions with objects include: viewing videos, commenting on posts, sharing links, checking-in to physical locations via a mobile device, accessing content items, and any other suitable interactions. Additional examples of interactions with objects on the online system 110 that are included in the action log 210 include: viewing videos posted by a user's connections in the online system 110, commenting on a photo album, communicating with a user, establishing a connection with an object, joining an event, joining a group, creating an event, authorizing an application, using an application, expressing a preference for an object ("liking" the object), and engaging in a transaction. Additionally, the action log 210 may record a user's interactions with sponsored content on the online system 110 as well as with other applications operating on the online system 110. In some embodiments, data from the action log 210 is used to infer interests or preferences of a user, augmenting the interests included in the user's user profile store 200 and allowing a more complete understanding of user preferences.

In one embodiment, the edge store 220 stores information describing connections between users and other objects on the online system 110 as edges. Some edges may be defined by users, allowing users to specify their relationships with other users. For example, users may generate edges with other users that parallel the users' real-life relationships, such as friends, co-workers, partners, and so forth. In one embodiment, the user profile store 200 stores data describing the connections between different users of the online system 110, such as the number of friends shared between the users out of the total number of friends, the fraction of time since joining or becoming a member of the social networking system that overlaps between the two users (e.g., whether the users joined the online system at the same time or have an overlap for a certain period of time), or a combination of these signals. The record of users and their connections in the online system 110 may be called a "social graph."

Other edges are generated when users interact with objects in the online system 110, such as expressing interest in a page on the online system 110, sharing a link with other users of the online system 110, viewing videos posted by other users of the online system 110, and commenting on posts or videos provided by other users of the online system 110. The connections between users and other objects, or edges, can be unidirectional (e.g., a user following another user) or bidirectional (e.g., a user is a friend with another user).

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 110, or information describing demographic information about a user. Each feature may be associated with a source object or user, a target object or user, and a feature value. A feature may be specified as an expression based on values describing the source object or user, the target object or user, or interactions between the source object or user and target object or user. Hence, an edge may be represented as one or more feature expressions.

The edge store 220 also stores information about edges, such as affinity scores for objects, interests, and other users. In one embodiment, affinity scores, or "affinities," are computed by the online system 110 over time to approximate a user's interest in an object or another user in the online system 110 based on the actions performed by the user. A user's affinity may be computed by the online system 110 over time to approximate a user's affinity for an object, interest, and other users in the online system 110 based on the actions performed by the user. Multiple interactions between a user and a specific object may be stored as a single edge in the edge store 220, in one embodiment. Alternatively, each interaction between a user and a specific object is stored as a separate edge.

The content store 215 stores objects that represent various types of content. Examples of content represented by an object include a video, page post, status update, photograph, link, shared content item, gaming application achievement, check-in event at a local business, brand page, or any other type of content. Online system 110 users may create objects stored by the content store 215, such as status updates, photos tagged by users to be associated with other objects in the online system 110, events, groups, or applications. In some embodiments, objects are received from third party websites 130 and placed in the content store 215. These objects may represent sponsored content campaigns provided to the third party website 130 by a content provider system 101.

The website crawler 225 crawls third party websites to retrieve information describing items from the third party website and stores the retrieved information in the metadata store 116. In an embodiment, the website crawler 225 retrieves information from third party websites responsive to the online system 110 receiving tracking requests with missing parameters. In these embodiments, the website crawler 225 crawls the third party website to identify missing parameters associated with an item displayed on a web page that caused a tracking request 111. For example, if the online system 110 receives parameters associated with a shoe displayed on a shopping page, the online system 110 can store this information in the metadata store 116. However, if a price of the shoe is not provided in the tracking request 111, the online system 110 can use the website crawler 225 to identify the shoe and retrieve the missing price of the shoe contained within the HTML of the web page. The website crawler 225 can store missing parameters in the metadata store 116. In an embodiment, the website crawler 225 uses test accounts to connect with the third party website 130. The website crawler 225 sends requests to the third party website 130 to retrieve item information. For example, the website crawler 225 may generate an HTTP (hypertext transfer protocol) request for performing a search for a particular item or browse the particular item. The website crawler 225 receives a web page from the third party website 130 and extracts information describing the item from the web page. The website crawler 225 provides the missing parameters to the parameter predictor and also stores the metadata describing the item in the metadata store 116. In an embodiment, the website crawler 225 sends HTTP requests representing keyword searches to retrieve items matching the as search request. The website crawler 225 sends follow-up HTTP requests to retrieve detailed information for each item returned by the previous request. The website crawler 225 stores the metadata describing the items in the metadata store 116. Accordingly, the website crawler 225 periodically accesses third party websites 130 to build a metadata store 116 that represents an item catalog or a product catalog.

The parameter predictor 112 can be used by the online system 110 to predict parameters missing from tracking requests 111. For example, a web page that prompts a user to add items to an online cart for purchase (e.g., addToCart web page) may generate a tracking request 111 that does not include the price of the item being added to the cart, or may fail to identify the item entirely. The parameter predictor 112 can determine that one or more parameters are missing from the tracking request 111, identify which parameters are missing from the metadata store 116, and annotate the tracking request 111 entry in the metadata store 116 with predicted parameters. In an embodiment, the parameter predictor 112 predicts parameters for parameters that are missing from a tracking request 111 by collecting all available parameters provided with the tracking request 111. The parameter predictor 112 can then build a search request for the metadata store 116 that is configured to identify all items in the metadata store 116 that match the available parameters collected from the tracking request 111. The parameter predictor 112 executes the search request to retrieve a set of items that match the available parameters used to build the search request. In one embodiment, the search request uses fuzzy logic, identifying items that closely match the parameters provided in the search request, but may not produce an exact match. For example, if the available parameters used to build the search request include a price value of $19.00, items in the metadata store 116 having prices of $19.10, $19.20, and $19.30 may qualify as matches.

The parameter predictor 112 can assign scores used to rank a set of items returned as matches from a search request. In one embodiment, the parameter predictor 112 can identify a degree of a match between the available parameters used to build the search request and the set of items returned from the search request. For example, items that have a closer match with the available parameters are ranked higher than items that have a lesser degree of match.

In another embodiment, the parameter predictor 112 determines whether items returned as matches from a search request were received from the client device 120 that generated the current tracking request 111 with missing parameters within the current session. For example, if a set of items was identified as a match with available parameters in a search request, the items identified in tracking requests 111 from the same session as the current tracking request 111 are ranked higher than those from previous sessions. The online system 110 determines a set of tracking requests as being generated by the same session of the client device with a third party web site if consecutive tracking requests from the set were received within a time interval of a size less than a threshold value. For example, a client device may send a search request to a third party website and send a tracking request describing the items returned by the third party website. Subsequently the client device sends a tracking request generated by a web page representing an add-to-cart event and the tracking request is missing the identifier of the item that was added to the shopping cart but specifies the price of the item added. The parameter predictor 112 determines that items that match the price and were also identified in the search request are highly likely represent the missing information.

In a similar embodiment, the parameter predictor 112 can determine whether items returned as matches from a search request were received from the client device 120 that generated the current tracking request 111 within previous sessions. For example, if a set of items associated with tracking requests 111 sent from the same client device 120 several days, or weeks, prior to the current session was identified as a match, the items having the most recent tracking requests 111 would receive a higher ranking than those items having tracking requests 111 generated at an earlier date. In yet another embodiment, the parameter predictor 112 can determine whether items returned as matches from a search request were received from client devices 120 of other online system 110 users that are similar to the user of the client device 120 that generated the current tracking request 111. The parameter predictor 112 extracts user profile attributes from the user profile stores 200 of the other users and compares those attributes to the attributes of the current user. The items associated with tracking requests 111 generated by client devices 120 of users having the greatest similarity to the current user are ranked higher than those having fewer similarities.

In general, items that match the available parameters of a tracking request 111 are ranked based on weights that are assigned by the parameter predictor 112 to each respective match. The parameter predictor 112 identifies items from previous tracking requests 111 sent from the current client device 120 within the current session, and assigns the items higher weight, compared to items identified in tracking requests from previous sessions of the current client device or from other client device. Items that are identified from previous tracking requests 111 sent from the current client device 120 within previous sessions are assigned less weight than those tracking requests 111 sent from the current session of the current client device. Lastly, items that match the available parameters identified in tracking requests sent from previous sessions of client devices of other users similar to the current user are weighted less than items identified in sessions of the current device.

The parameter predictor 112 uses information obtained from past tracking requests received from client device of a particular user to determine parameters missing from a current tracking request 111 received from a client device of that particular user. For example, if a user has previously interacted with an item displayed on a web page by adding the item to a cart for checkout, or by searching for similar items, these actions are stored in association with the user profile store 200 of that particular user. In the event a purchase is made but an item price is not included in the tracking request 111, for example, the parameter predictor 112 determines that the purchase was most likely of the item with which the previously interacted.

The metadata store builder 230 builds a metadata store 116 containing metadata describing one or more items by collecting information from various sources including tracking requests 111, web crawling of websites, and/or user profile stores of online system 110 users. The metadata store builder 230 receives parameters from tracking requests 111, and stores metadata derived from the received parameters in the metadata store 116. In some embodiments, for example, if the parameters are missing from a tracking request 111, the metadata store builder 230 invokes the website crawler 225 to extract item information (e.g., item category, item price, item ranking, and the like) from the HTML (hypertext markup language) specification of the web page on which the item was displayed.

In an embodiment, the metadata store builder 230 identifies the users associated with tracking requests 111, and stores information describing the users in the metadata store 116. For example, the metadata store builder 230 aggregates user attributes (e.g., geographic location, age, education, etc.) over several tracking requests 111 to determine categories of users that have shown interest in an item. The metadata store builder 230 annotates entries in the metadata store 116 with user information describing the categories of users associated with each item. The categories of users may be described in terms of demographic attributes, for example, locations of users, age ranges, ethnicity, financial status, and the like. For example, the metadata store builder 230 determines and store information indicating that people of a certain age group are interested in a particular item, people associated with a particular location are interested in a different item, and so on. The parameter predictor 112 matches user profile attributes of a user associated with a tracking request with categories of user profiles associated with items stored in the metadata store to rank items. For example, items that match a tracking request are ranked based on a degree of match between the user profile of the user associated with a tracking request and the categories of users associated with the matching items.

The metadata store 116 includes aggregated metadata derived from parameters describing items displayed on a web page of a third party website 130. The metadata describing each item may be collected from one or more tracking requests 111 sent by client devices 120 of users interacting with web pages that display the items, or by directly web crawling each web page of a third party website 130.

The metadata store 116 may be implemented using a relational database such as using one or more database tables, for example. These database tables can store metadata describing an item including item identifiers, item names, item prices, item attributes (e.g., color, size, rating, brand name, etc.), a time duration associated with a service such as how long a service is available, and/or attributes that are specific to an item (specified as name value pairs). For example, an item like a vehicle may have attributes such as manual or automatic, whereas an item describing a vacation package may have a duration and location of the vacation. Additionally, the table may include columns storing information describing categories of users that are interested in a particular item. For example, user belonging to certain age group, ethnicity, location, etc., or sets of users specified using combinations of such attributes.

The report builder 235 builds various types of reports based on collected and predicted parameters contained in the metadata store 116. The report builder 235 builds a report describing whether parameters provided by a content provider system 101 (e.g., advertiser) via tracking requests 111 are valid. The report may associate tracking request 111 parameters with scores indicating the likelihood of the parameters being populated correctly, or an "accuracy score." In order to validate available parameters, the report builder 235 predicts one or more parameters as if they were are missing from a tracking request 111 even if they were included in the tracking request 111. In one embodiment, the report builder 235 can send the available parameters from the tracking request 111 (other than those assumed missing) to the parameter predictor 112 to predict parameters based on the available parameters. If the predicted values of the parameters do not match the actual values of the parameters across more than a threshold number of tracking requests associated with a web page, the report builder 235 determines that the tracking request 111 parameters are likely to be populated incorrectly and includes this determination in an accuracy report. The accuracy report may then be provided to the content provider system 101 so that if there are errors in the instructions of tracking requests that populate the incorrect parameters, they are corrected.

In some embodiments, the report builder 235 builds a report describing accurate return on ad spend (ROAS) for content provider systems (e.g., advertisers), or an "ROAS report." However, a ROAS report generated by using incorrect or incomplete tracking request 111 parameters is inaccurate and/or incomplete. Therefore, the parameter predictor 112 is used to populate missing or inaccurate parameters with correct parameter values to generate an accurate ROAS report. Similarly, the report builder 235 may build a report that associates categories of items with categories of users that may be interested in those items in order to better target users with content associated with items they are more likely to find of interest, or a "user interest report." The online system 110 provides a content provider system 101 with a user interest report that matches item categories to user categories to allow the content provider system 101 to better target online system 110 users with content.

The report store 114 stores reports to be provided to content provider systems 101. The online system 110 may use metadata from the metadata store 116 to generate accurate reports. Without using this information, the reports generated may be inaccurate or incomplete if the parameters provided by the content provider systems 101 via tracking requests 111 are incorrect or incomplete. A content provider system 101 may choose to receive accurate reports or inaccurate reports. In addition, the online system 110 may provide replacement parameters from the metadata store 116 if the content provider system 101 wishes to update its missing or inaccurate parameters.

Process for Building Metadata Store

Figure 3:
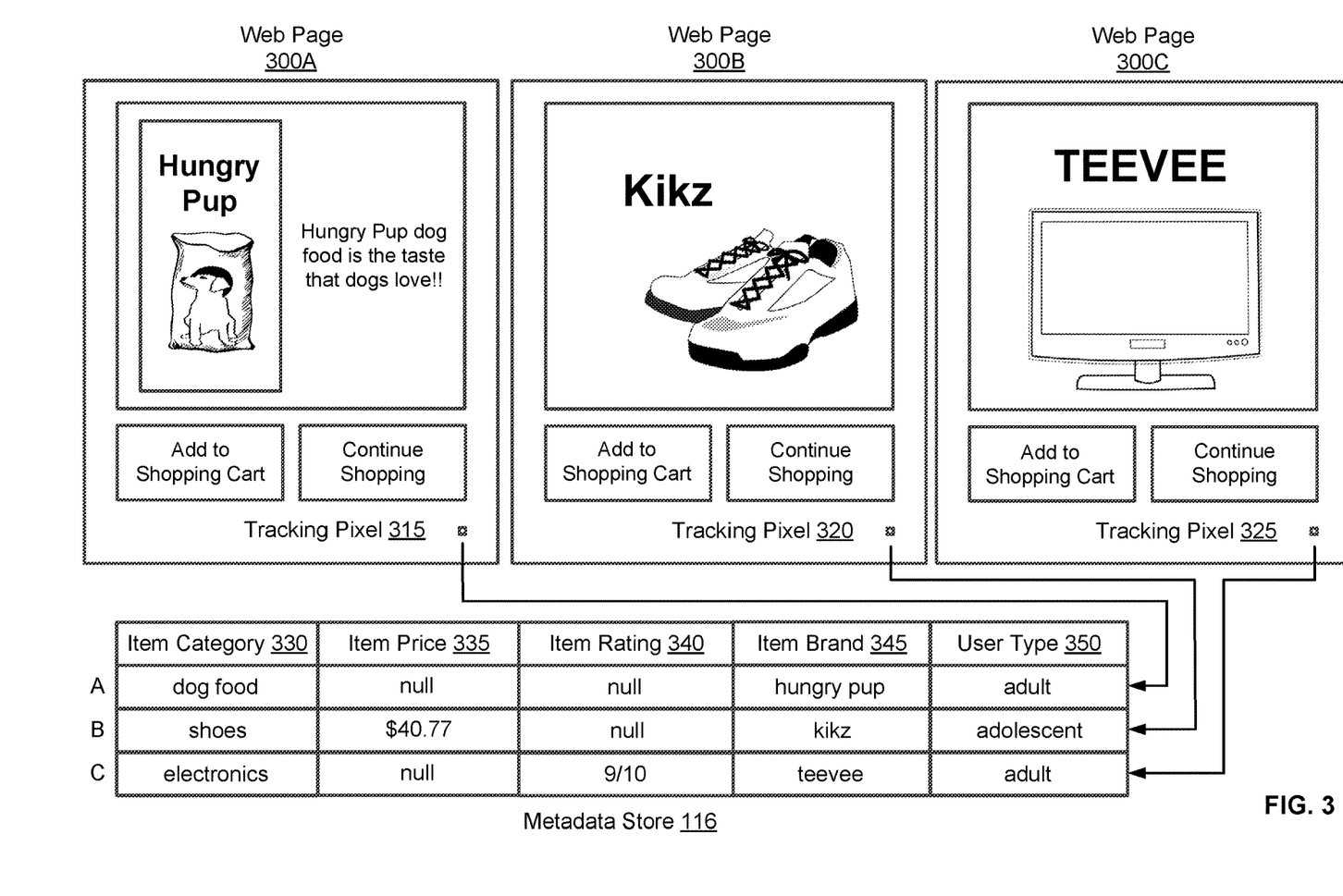
FIG. 3 illustrates an example use case of receiving and storing metadata, in accordance with an embodiment.

FIG. 3 illustrates several example use cases of storing metadata received from tracking requests 111 in the metadata store 116, according to one embodiment. In the embodiment illustrated in FIG. 3, web page 300A displays a bag of dog food (e.g., Hungry Pup). This web page 300A contains a tracking pixel 315 that sends a tracking request 111 to the online system 110 as the web page 300A is loaded. The online system 110 receives the tracking request 111 and stores metadata contained within the tracking request 111 in the metadata store 116. However, the metadata received from the tracking request 111 is missing parameters (e.g., item price and item rating). This is illustrated in FIG. 3 where an entry of "null" appears under the item price 335 and item rating 340 columns in row A. Web page 300B also contains a tracking pixel 320 that sends a tracking request 111 to the online system 110 in response to rendering. This web page 300B displays a pair of shoes (e.g., Kikz). When the web page 300B is rendered, metadata associated with the tracking request 111 describing the shoes is received by the online system 110 and stored in the metadata store 116. However, this tracking request 111 is missing one parameter (e.g., item rating). This is illustrated in FIG. 3 where an entry of "null" appears below the item rating 340 column in row B. Lastly, web page 300C also contains a tracking pixel 325 that sends metadata to the online system 110 in response to rendering. This web page 300C displays a television (e.g., TEEVEE) and sends metadata describing the television to the online system 110. However, this metadata is missing a parameter (e.g., item price). This is illustrated in FIG. 3 where an entry of "null" appears below the item price 335 column in row C.

Process for Obtaining Metadata by Web Crawling

Figure 4:
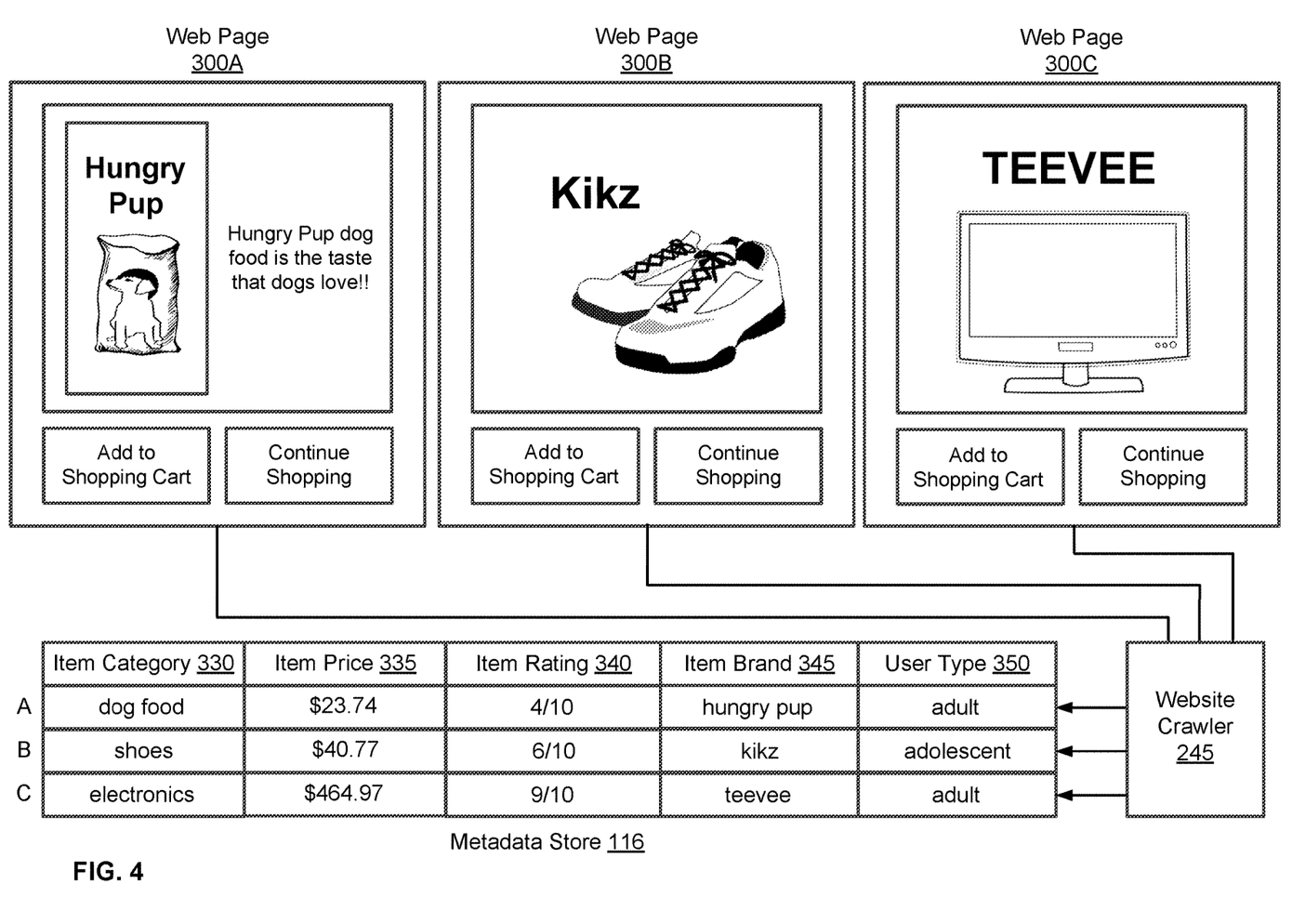
FIG. 4 illustrates an example use case of collecting and storing metadata, in accordance with an embodiment.

FIG. 4 illustrates the process by which the website crawler 225 identifies and stores missing parameters from tracking requests 111, according to one embodiment. These missing parameters are shown in FIG. 3 with an entry of "null" indicating that the parameters were not provided in the tracking request 111 received from the web page. In order to retrieve the missing parameters, the website crawler 225 accesses the third party website 130 that sent the web pages that generated the tracking requests to directly access web pages describing the items (e.g., web pages 300A-C). The online system 110 analyzes the retrieved web page to extract information describing the items. The website crawler 225 analyzes the web page (e.g., HTML code) to retrieve parameters associated with the item to be included in the metadata store 116. In the example illustrated in FIG. 4, the website crawler 225 obtains web page 300A and identifies the item price 335 and item rating 340 metadata described in web page 300A's HTML. Similarly, the website crawler 225 can revisit web page 300B and can retrieve the missing item rating 340 parameters to be included in the metadata store 116. Lastly, the website crawler 225 can revisit web page 300C and can retrieve the missing item price 335 parameters to be stored in the metadata store 116.

Process for Annotating Missing Parameters

Figure 5:
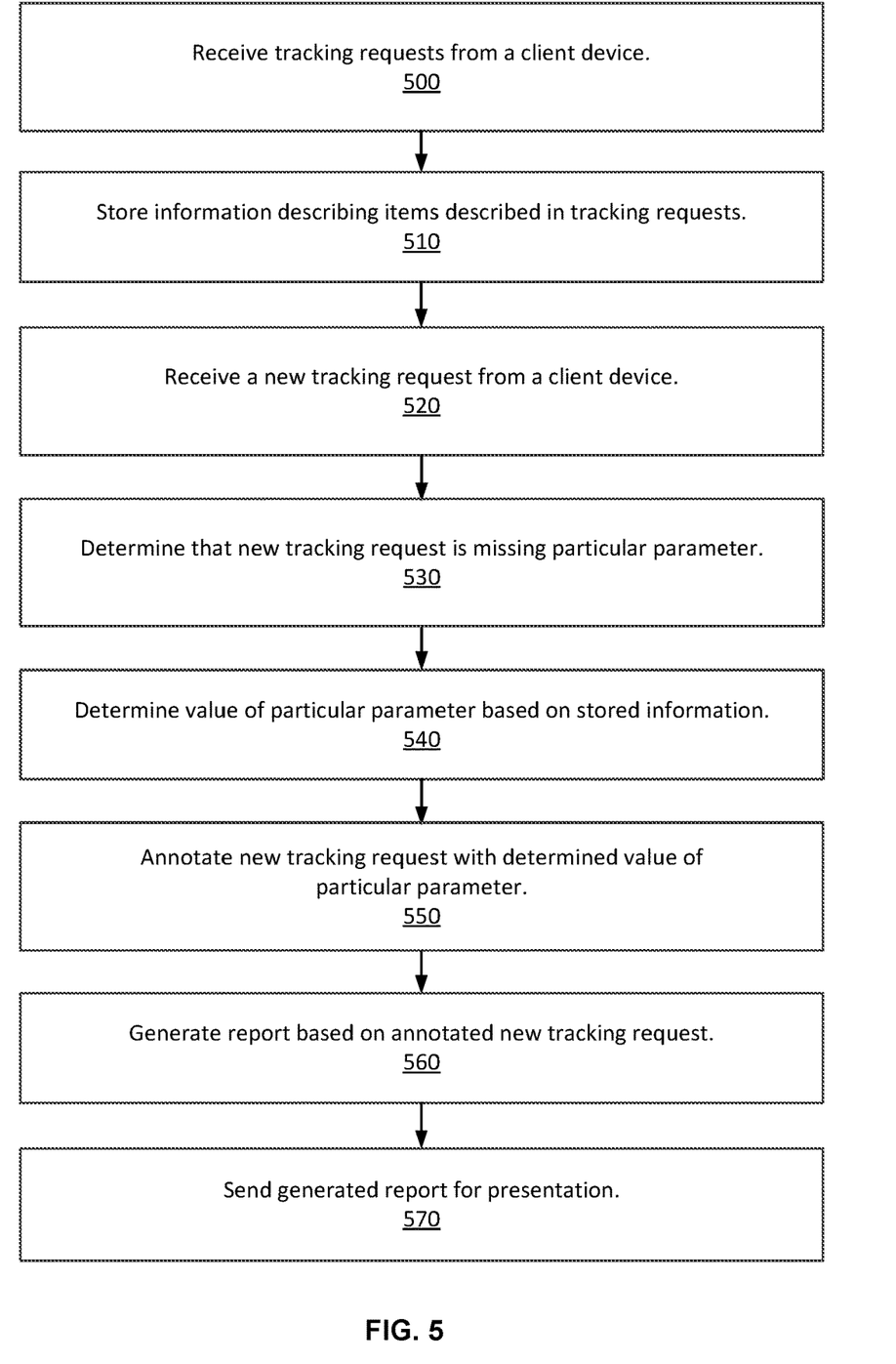
FIG. 5 illustrates a flowchart of the process for collecting and storing metadata, in accordance with an embodiment.

FIG. 5 illustrates a process for annotating tracking request metadata with parameters that were previously missing, or otherwise not included, in the tracking request 111, according to one embodiment. In the embodiment illustrated in FIG. 5, the online system 110 receives 500 tracking requests from a client device indicating that a web page containing a tracking pixel has been displayed to a user. This tracking request is associated with metadata that the online system stores 510 in the metadata store. The online system subsequently receives 520 a new tracking request from a client device and determines 530 that the new tracking request is associated with a web page that previously failed to provide parameters describing one or more items displayed on the web page. The online system then determines 540 the value of the missing parameter based on the metadata describing the item stored in the metadata store. The determined value of the missing parameter is annotated 550 into the new tracking request. Lastly, a report is generated 560 based on the annotated new tracking request and sent 570 to the content provider system for presentation.

ALTERNATIVE EMBODIMENTS

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A computer-implemented method comprising:
    receiving, by an online system, a plurality of tracking requests from a client device, each tracking request generated responsive to the client device presenting a user interface received by the client device from a third party website, the client device configured to execute instructions to cause one or more tracking requests to be generated, the instructions executed by the client device when the client device renders a webpage received from the third party web site, the webpage including one or more metadata attributes;
    storing, by the online system, the one or more metadata attributes received via the plurality of tracking requests;
    receiving, by the online system, a new tracking request from a client device associated with a user, wherein the instructions, when executed by the client device associated with the user, populate a value of a particular parameter of the new tracking request;
    identifying, by the online system, a plurality of previous tracking requests received before the new tracking request, wherein the plurality of previous tracking requests comprises information describing search requests performed by the user and information describing a particular item returned in a search request;
    comparing, by the online system, metadata attributes extracted from the plurality of previous tracking requests and metadata attributes extracted from the new tracking request;
    determining, based on the comparing, that the particular parameter is populated with an unexpected value in the new tracking request;
    determining that the particular parameter of the new tracking request is at least one of an item category, an item price, an item rating, or an item brand of the particular item;
    determining, by the online system, an expected value of the particular parameter based on the metadata attributes extracted from the plurality of previous tracking requests;
    annotating, by the online system, the data of the new tracking request with the determined expected value of the particular parameter;
    generating, by the online system, a report based on the annotated data of the new tracking request; and
    sending, by the online system, the generated report for presentation.

2. The computer-implemented method of claim 1, wherein storing the one or more metadata attributes received via the plurality of tracking requests comprises:
    building a catalog describing a plurality of items based on the plurality of tracking requests wherein the catalog stores attributes of each item.

3. The computer-implemented method of claim 2, further comprising:
    sending a request for information to the third party website; and
    adding information received from the third party website to the catalog being built.

4. The computer-implemented method of claim 1, wherein each of the plurality of tracking requests is associated with a distinct session created by one of a plurality of client devices.

5. The computer-implemented method of claim 1, wherein each of the plurality of tracking requests is associated with one or more sessions created by one of a plurality of client devices.

6. The computer-implemented method of claim 1, wherein the tracking request is received from the client device responsive to the client device rendering the web page for display, wherein the rendering of the web page causes execution of instructions for sending a tracking request to the online system.

7. The computer-implemented method of claim 1, further comprising:
    sending one or more content items to the client device based on the annotated tracking requests.

8. The computer-implemented method of claim 1, further comprising extracting, using a website crawler, at least one of the one or more metadata attributes from the third party website.

9. The computer-implemented method of claim 1, wherein the plurality of tracking requests is a first plurality of tracking requests, and wherein generating the report based on the annotated data of the new tracking request comprises:
    determining that the value of the particular parameter is unexpected for a second plurality of tracking requests associated with a third party website; and
    responsive to the second plurality of tracking requests exceeding a threshold number, generating an accuracy report indicating that the instructions should be corrected.

10. The computer-implemented method of claim 1, further comprising:
    responsive to determining that the tracking request of the plurality of tracking requests was generated by the client device associated with the user, selecting the tracking request of the plurality of tracking requests.

11. The computer-implemented method of claim 1, wherein the user is a first user associated with a first plurality of user profile attributes, further comprising:
    extracting a second plurality of user profile attributes associated with a second user;
    comparing the first plurality of user profile attributes and the second plurality of user profile attributes;
    determining that first user and second user are similar; and
    selecting, based on the determined similarity, the tracking request of the plurality of tracking requests, the tracking request generated by a client device associated with the second user.

12. The computer-implemented method of claim 1, wherein the tracking request of the plurality of tracking requests is a first tracking request, further comprising:
   assigning weights to a first plurality of content items identified from the first tracking request and to a second plurality of content items identified from a second tracking request of the plurality of tracking requests; and
   responsive to determining that the weights assigned to the first plurality of content items are greater than the weights assigned to the second plurality of content items, selecting the first tracking request.

13. The computer-implemented method of claim 12, wherein the assigning is based on at least one of a threshold amount of time, a plurality of client devices that generated the plurality of tracking requests, or the user profiles associated with the plurality of client devices that generated the plurality of tracking requests.

14. The computer-implemented method of claim 1, further comprising determining that the new tracking request was received within a threshold amount of time of receiving the tracking request of the plurality of tracking requests.

15. The computer-implemented method of claim 1, wherein the unexpected value is one of a missing value or an incorrect value.

16. A non-transitory computer readable storage medium storing instructions for:
   receiving a plurality of tracking requests from a client device, each tracking request generated responsive to the client device presenting a user interface received by the client device from a third party website, the client device configured to execute instructions to cause one or more tracking requests to be generated, the instructions executed by the client device when the client device renders a webpage received from the third party web site, the webpage including one or more metadata attributes;
   storing the one or more metadata attributes received via the plurality of tracking requests;
   receiving a new tracking request from a client device associated with a user, wherein the instructions, when executed by the client device associated with the user, populate a value of a particular parameter of the new tracking request;
   identifying a plurality of previous tracking requests received before the new tracking request, wherein the plurality of previous tracking requests comprises information describing search requests performed by the user and information describing a particular item returned in a search request;
   comparing metadata attributes extracted from the plurality of previous tracking requests and metadata attributes extracted from the new tracking request;
   determining, based on the comparing, that the particular parameter is populated with an unexpected value in the new tracking request;
   determining that the particular parameter of the new tracking request is at least one of an item category, an item price, an item rating, or an item brand of the particular item;
   determining an expected value of the particular parameter based on the metadata attributes extracted from the plurality of previous tracking requests;
   annotating the data of the new tracking request with the determined expected value of the particular parameter;
   generating a report based on the annotated data of the new tracking request; and
   sending the generated report for presentation.

17. The non-transitory computer readable storage medium of claim 16, wherein instructions for storing the one or more metadata attributes received via the plurality of tracking requests comprises instructions for:
   building a catalog describing a plurality of items based on the plurality of tracking requests wherein the catalog stores attributes of each item.

18. The non-transitory computer readable storage medium of claim 17, wherein the stored instructions are further for:
   sending a request for information to the third party website; and
   adding information received from the third party website to the catalog being built.

19. A computer system comprising:
   one or more processors; and
   a non-transitory computer readable storage medium storing instructions for:
      receiving a plurality of tracking requests from a client device, each tracking request generated responsive to the client device presenting a user interface received by the client device from a third party website, the client device configured to execute instructions to cause one or more tracking requests to be generated, the instructions executed by the client device when the client device renders a webpage received from the third party web site, the webpage including one or more metadata attributes;
      storing the one or more metadata attributes received via the plurality of tracking requests;
      receiving a new tracking request from a client device associated with a user, wherein the instructions, when executed by the client device associated with the user, populate a value of a particular parameter of the new tracking request;
      identifying, by the online system, a plurality of previous tracking requests received before the new tracking request, wherein the plurality of previous tracking requests comprises information describing search requests performed by the user and information describing a particular item returned in a search request;
      comparing, by the online system, metadata attributes extracted from the plurality of previous tracking requests and metadata attributes extracted from the new tracking request;
      determining that the particular parameter is populated with an unexpected value in the new tracking request;
      determining that the particular parameter of the new tracking request is at least one of an item category, an item price, an item rating, or an item brand of the particular item;
      determining an expected value of the particular parameter based on the metadata attributes extracted from the plurality of previous tracking requests;
      annotating the data of the new tracking request with the determined expected value of the particular parameter;
      generating a report based on the annotated data of the new tracking request; and
      sending the generated report for presentation.

* * * * *

UNITED STATES PATENT AND TRADEMARK OFFICE
CERTIFICATE OF CORRECTION

PATENT NO. : 10,991,037 B1  
APPLICATION NO. : 15/895749  
DATED : April 27, 2021  
INVENTOR(S) : Tobias Henry Wooldridge et al.

Page 1 of 1

It is certified that error appears in the above-identified patent and that said Letters Patent is hereby corrected as shown below:

In the Claims

In Column 15, Claim 1, Line 34, delete "web site," and insert -- website, --, therefor.

In Column 16, Claim 9, Line 45, delete "a third," and insert -- the third --, therefor.

In Column 17, Claim 16, Line 36, delete "web site," and insert -- website, --, therefor.

In Column 18, Claim 19, Line 29, delete "web site," and insert -- website, --, therefor.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*